Sept. 1, 1970

OPTICAL MONITORING OF WELDING SYSTEMS

Filed Aug. 2, 1968

United States Patent Office 3,526,748
Patented Sept. 1, 1970

3,526,748
OPTICAL MONITORING OF WELDING SYSTEMS
Frits Rienks, Niantic, Conn., assignor to General Dynamics Corp., New York, N.Y., a corporation of Delaware
Filed Aug. 2, 1968, Ser. No. 749,660
Int. Cl. B23k 9/10
U.S. Cl. 219—131
15 Claims

ABSTRACT OF THE DISCLOSURE

A welding system in which a visual image of the weld is transmitted by a flexible fiber optics bundle to a remotely located detector. A rotating mask having adjustable apertures periodically interrupts the image at a frequency such that the image appears substantially stationary at the detector. The image may be evaluated by visual observation, or it may be scanned to produce an electrical feedback signal which is effective to control an automatic welding circuit in accordance with the parameters of the weld being formed.

---

This invention relates to welding systems and more particularly to such systems of the type in which a visual image of the weld is transmitted to a remotely located detector.

The present invention, while of general application, is particularly applicable to welding systems of the type in which electrical current pulses are applied to a welding electrode to generate successive electric arcs for forming droplets of weld material. In order to effectively evaluate the quality of the weld as it is formed, it is highly desirable to ascertain the size of the droplets, the characteristics of the arc and other weld parameters. At pulse frequencies above about twelve pulses per second, however, direct visual observation of the droplets becomes problematic. Accordingly, attempts have been made to evaluate the droplets through the use of high-speed motion pictures, for example. These attempts have not been entirely satisfactory, among other reasons because of the shortness of the actual welding time and the need for shipping and processing the film before a meaningful evaluation can be made.

One general object of this invention, therefore, is to provide a new and improved welding system in which a visual image of the weld may be continuously observed as the weld is being formed.

More specifically, it is an object of this invention to provide a welding system of the character indicated in which the visual image of the weld is modified to produce a substantially stationary representation of the individual droplets of weld material at a remote location.

Another object of the invention is to provide such a welding system in which the intensity of the detected image may be readily adjusted during the welding operation to produce an extremely well-defined representation of the weld.

Still another object of this invention is to provide a system for producing a visual image of a weld which is substantially unaffected by splatter or other contaminants.

A further object of this invention is to provide an automatic welding system in which the formation of the weld is continuously controlled in accordance with such parameters as arc shape, size, color, intensity and other phenomena.

A still further object of the invention is to provide novel monitoring apparatus for a welding system which is economical to manufacture and thoroughly reliable in operation.

In one illustrative embodiment of this invention, the welding system includes an electrical circuit for applying current pulses to a welding electrode at a predetermined frequency to generate successive arcs for forming droplets of weld material. A flexible fiber optics bundle or other light conducting means is positioned with one end adjacent the weld and the opposite end at a remote location. The bundle is effective to transmit an optical image of the weld to a detector at the remote location. The image may be evaluated visually at the detector, or it may be scanned to produce an electrical feedback signal for controlling an automatic welding circuit in response to the weld being formed.

In accordance with one feature of the invention, there is provided unique means for modifying the image transmitted by the light conducting means to produce a substantially stationary representation of the weld at the detector. With this arrangement, the various weld parameters, such as the characteristics of the arc, the size of the droplets, etc., may be readily measured during the formation of the weld.

In accordance with another feature of the invention, in certain particularly advantageous embodiments, the modifying means comprises a rotating mask or reticle which is interposed in the path of the image and is provided with a pair of apertured discs in fixed but adjustable relationship with each other. The arrangement is such that the width of the effective aperture of the mask may be quickly and easily varied during the operation of the apparatus to adjust the intensity of the light reaching the detector.

In accordance with another feature of the invention, in some arrangements, there is provided a continuously rotating transparent member between the objective end of the light conducting means and the welding arc. The transparent member is driven by jets of inert gas and is effective to shield the objective end from the deleterious effects of weld splatter and other contaminants.

The present invention, as well as further objects and features thereof, will be understood more clearly and fully from the following description of a preferred embodiment, when read with reference to the accompanying drawings, in which.

Figure 1:
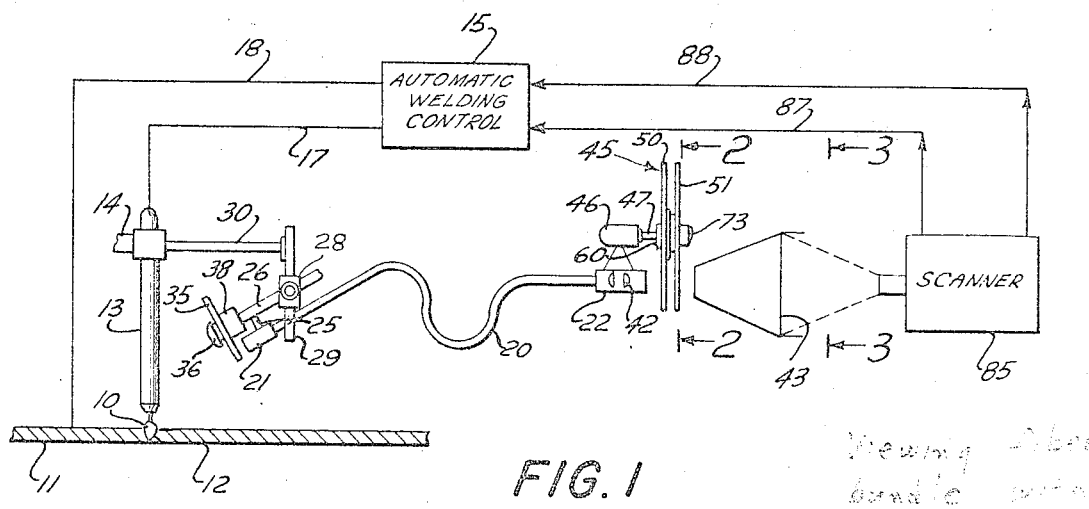
FIG. 1 is a schematic representation of an automatic welding system in accordance with one illustrative embodiment of the invention.

Referring to FIG. 1 of the drawings, there is shown a welding system for producing a seam weld 10 between two plates 11 and 12 which form a work piece. The system includes a welding electrode 13 which illustratively is of the consumable type and is supported by a movable arm 14 in juxtaposition to the weld 10. An automatic welding control circuit 15 of conventional construction is electrically connected to the electrode 13 by a conductor 17 and to the plate 12 by a conductor 18. As will be understood, the circuit 15 is effective to apply electrical current pulses to the electrode 13 at a predetermined frequency to generate successive electric arcs between the electrode and the work piece. Each of the generated arcs form a droplet of weld material which passes from the electrode to the weld. The arm 14 moves the electrode 13 along the seam at a uniform rate to produce a continuous joint between the plates 11 and 12.

In welding systems of the foregoing type, it is highly desirable to determine the various parameters of the weld during the welding operation. The detection of such phenomena as the shape and size of the individual droplets, the arc shape, size, color, intensity, etc., enables the accurate and precise control over the welding circuit to insure the formation of a uniform and continous weld.

In the system of FIG. 1, the parameters of the weld are readily ascertained through the use of a flexible fiber optics bundle indicated generally at 20. The objective end 21 of the bundle 20 is disposed in spaced juxtaposition with the electric arc between the electrode 13 and the work piece, while the opposite end 22 of the bundle is remotely located with respect to the arc. The bundle 20 is of conventional construction and comprises a multiplicity of fine glass fibers extending from one end of the bundle to the other. The ends of the fibers adjacent the objective end are oriented with respect to the fibers at the remote end such that an accurate and well-defined image of the arc and the droplets being transferred is reproduced at the remote end.

The objective end 21 of the bundle 20 is supported by a rod 25 which is mounted on a second rod 26. This latter rod is connected by an adjustable bracket 28 to a depending arm 29. The arm 29 is affixed to the electrode support arm 14 by a laterally extending bar 30. The end 21 of the bundle is thus maintained in fixed relationship with the welding electrode 13, such that the movement of the electrode along the seam similarly moves the end 21.

Figure 4:
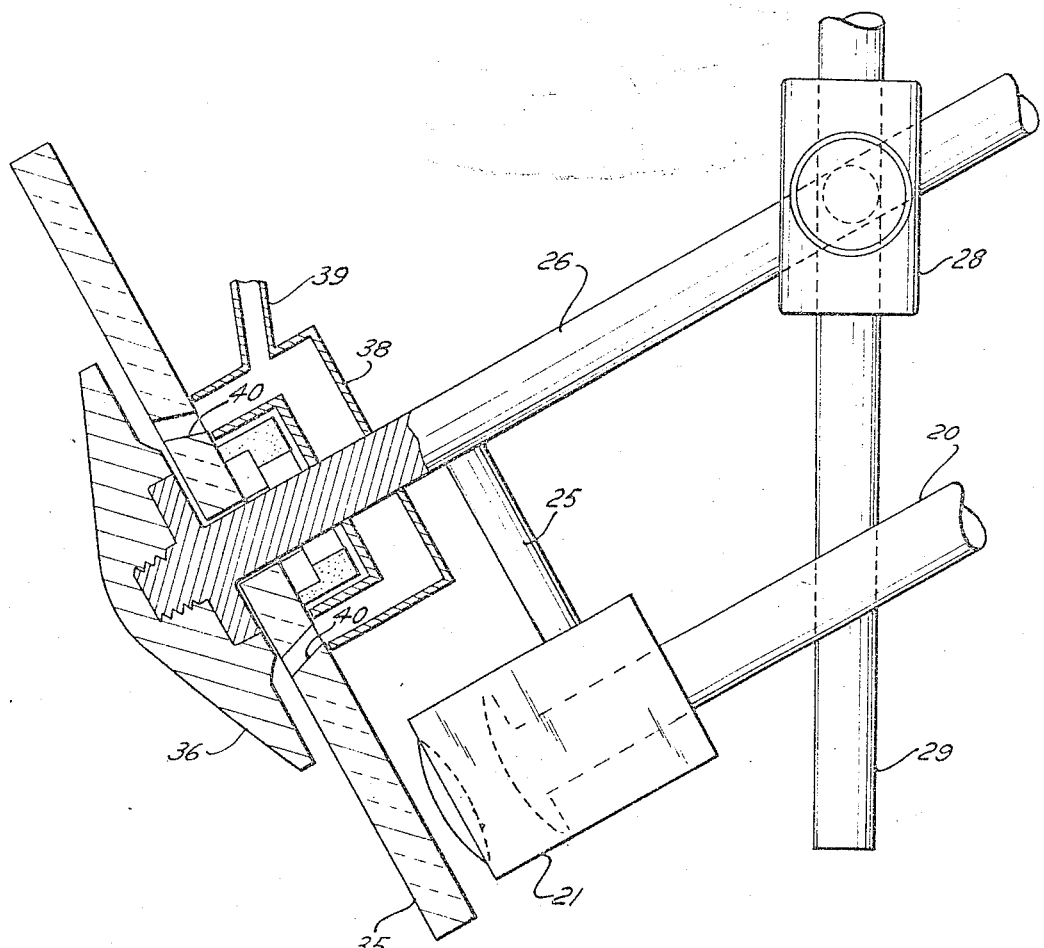
FIG. 4 is an enlarged elevational view, with certain parts shown broken away and in section, of a portion of the system illustrated in FIG. 1.

As best shown in FIG. 4, a transparent disc 35 is rotatably mounted at the end of the arm 26 adjacent the weld 10. The disc 35 is held in place by a stationary cap 36 on the arm 26 and is positioned such that its outer portion is interposed between the objective end 21 of the bundle 20 and the weld 10. Supported on the arm 26 at the side of the disc 35 opposite that adjacent the cap 36 is a housing 38. This housing is supplied with an inert gas under pressure through an inlet 39. The central portion of the disc 35 includes apertures 40 which are angularly disposed with respect to the axis of the disc and communicate with the interior of the housing 38. The pressurized gas within the housing passes through the apertures 40 to rotate the disc at a comparatively high speed.

The remotely located end 22 (FIG. 1) of the bundle 20 is provided with a suitable lens system 42 which is effective to detect and magnify the image from the bundle. Positioned in spaced relationship with the end 22 is a shielded screen 43 for observing the thus detected image.

Figure 2:
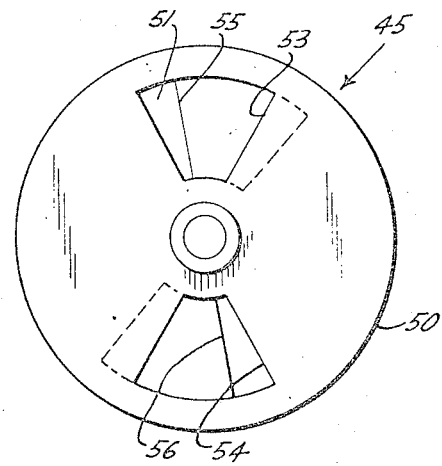
FIG. 2 is an enlarged fragmentary sectional view taken along the line 2—2 in FIG. 1.
Figure 5:
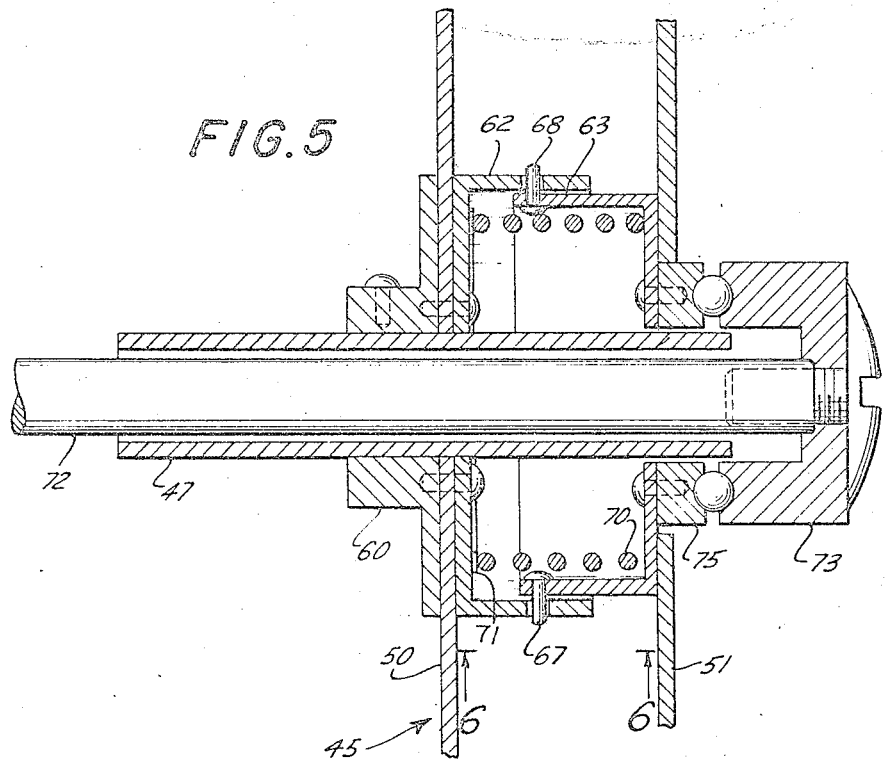
FIG. 5 is an enlarged vertical sectional view of another portion of the system illustrated in FIG. 1.

A rotating reticle or mask 45 is interposed between the end 22 and the screen 43. The mask 45 is driven by a variable speed electric motor 46 having a hollow output shaft 47. The mask comprises a pair of apertured chopper discs 50 and 51 which are best shown in FIGS. 2 and 5. The disc 50 is provided with two diametrically opposed openings 53 and 54, while the disc 51 similarly includes two diametrically opposed openings 55 and 56 which overlap the openings 53 and 54. The discs 50 and 51 are coaxial with the motor shaft 47 and are arranged in spaced-apart relationship with each other.

Figure 6:
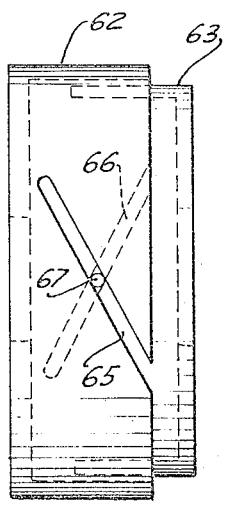
FIG. 6 is an elevational view of certain cooperating parts of the system as seen from the line 6—6 in FIG. 5.

The shaft 47 is fixedly secured to the disc 50 by a bushing 60 attached to one face of the disc. Mounted on the opposite face of the disc 50 is a cup-shaped member 62. A second cup-shaped member 63 carries the disc 51 and is telescoped within the member 62 for axial sliding movement with respect thereto. The member 62 includes diametrically opposed diagonal slots 65 and 66 (FIG. 6) which respectively accommodate radially extending pins 67 and 68 on the member 63. A coil spring 70 is interposed between the members 62 and 63 and is provided with a nylon seat 71 on the member 62. The spring 70 biases the member 63 and the attached disc 51 in an axial direction away from the member 62 and the attached disc 50.

Slidably disposed within the hollow drive shaft 47 is a control shaft 72. The shaft 72 is keyed or otherwise prevented from rotational motion but is arranged for limited movement in an axial direction. The shaft 72 includes an end cap 73 which engages a ball-bearing assembly 75 between the cap and the cup-shaped member 63. Upon axial movement of the shaft 72 to the left, as viewed in FIG. 5, against the biasing force exerted by the coil spring 70, the disc 51 is drawn toward the disc 50 and rotates relative thereto as a result of the diagonal slots 65 and 66 and the co-operating pins 67 and 68. This rotational movement changes the position of the openings 53 and 54 (FIG. 2) in the disc 50 relative to the corresponding openings 55 and 56 in the disc 51, for purposes that will become more fully apparent hereinafter.

In operation, successive electrical current pulses are generated by the control circuit 15 at the desired frequency to produce a series of electric arcs between the electrode 13 and the work piece. These arcs form droplets of weld material which contact the work piece at the frequency of the applied pulses to form the weld 10. An optical image of the arcs and the droplets is continuously conducted to the lens system 42 along the image transmitting path defined by the fiber optics bundle 20.

During the formation of the weld, the electric motor 46 drives the mask 45 at a constant speed which is proportional to the frequency at which the droplets of weld material contact the work piece. The motor rotates its output shaft 47 which in turn drives the bushing 60 and the attached disc 50. Driving power is transmitted from the disc 50 through the cup-shaped member 62, the pins 67 and 68 and the cup-shaped member 63 to rotate the disc 51 in fixed relationship with the disc 50.

Figure 3:
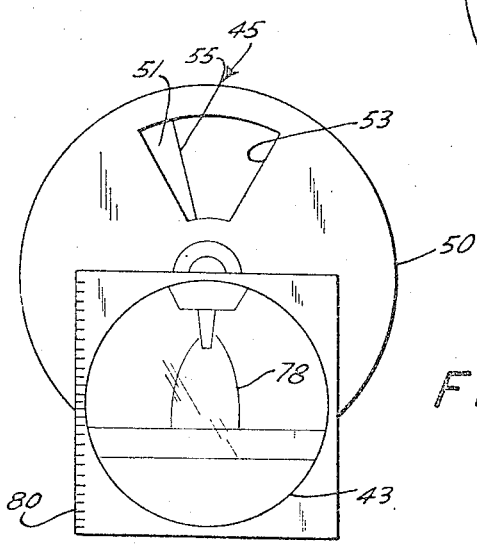
FIG. 3 is an enlarged fragmentary sectional view taken along the line 3—3 in FIG. 1.

The rotating discs 50 and 51 are effective to periodically interrupt the image from the fiber optics bundle 20 at the frequency of the welding pulses from the control circuit 15. In the illustrated embodiment, the speed of the motor 46 is adjusted until it is equal to one-half the frequency at which the droplets of weld material contact the work piece, such that as each droplet moves toward the work piece one of the openings formed by the overlapping portions of the apertures 53, 54, 55 and 56 moves in front of the lens system 42. As each opening passes in front of the lens system, a momentary image of the weld appears on the screen 43. Because of the relationship between the frequency of these momentary images and the frequency at which the droplets of weld material are formed, a substantially stationary representation 78 (FIG. 3) of the droplets is detected by the screen.

The apparatus thus enables the direct visual observation of the droplets and the attendant arc to permit the making of almost instantaneous physical measurements. To ascertain the vertical dimension of the droplets or to determine the length of the arc, for example, the screen 43 is provided with a suitable graduated scale 80. The droplets and the arc may be compared with known standards and may be analyzed with respect to color, shape, size, intensity, drop velocity, puddle behavior, metal transfer rate, surface tension effects and various other observable phenomena.

During the formation of the weld, inert gas under pressure is continuously introduced into the housing 38 (FIG. 4) through the inlet 39. The gas passes through the apertures 40 in transparent disc 35 to continuously rotate the disc at high speed. As the gas emerges from the forward face of the disc, it is radially deflected from the vicinity of the weld by the stationary cap 36. Splatter and other contaminants from the weld contact the rotating disc and are directed outwardly by centrifugal force away from the objective end 21 of the fiber optics bundle 20. With this arrangement, the end 21 is maintained optically clean, and the formation of an extremely well-defined image on the screen 43 is insured.

To adjust the effective width of the openings in the mask 45 during the welding operation, the control shaft 72 (FIG. 5) is moved in an axial direction relative to the drive shaft 47 to vary the spacing between the discs 50 and 51. As the disc 51 moves toward or away from the disc 50, the pins 67 and 68 slide in their corresponding slots 65 and 66 to produce a rotational force component which adjusts the relative angular positions between the discs. In cases in which the effective width of the openings on the mask is to be reduced, for example, the shaft 72 is moved to the left, as viewed in FIG. 5, to urge the disc 51 toward the disc 50 and simultaneously pivot the disc 51 in a clockwise direction (FIG. 2) relative to the disc 50. The effective width of the openings may be varied in a rapid and straightforward manner as the mask rotates to vary the intensity and definition of the image on the screen 43. With this arrangement, the optimum width for the particular operating conditions may be readily established.

In several advantageous embodiments of the invention, the stationary representation of the weld on the screen 43 is utilized to control the welding circuit 15. In these embodiments, an electro-optical scanner 85 is employed to scan the screen 43 and produce one or more feedback signals corresponding to such parameters as arc shape, size, color and intensity. To control the applied current and voltage, for example, feedback signals are produced which respectively correspond to the width and length of the arc as detected on the screen. The signals are differentiated and are transmitted to the circuit 15 through conductors 87 and 88 to permit the automatic adjustment of the welding operation in accordance with the detected characteristics of the arc. In a similar manner, the color or other characteristics of the representation of the droplets may be scanned by the scanner 85 to produce feedback signals for controlling selected variables in the formation of the weld.

Although the use of the rotating reticle or mask 45 has many important advantages, the invention in its broadest aspects is not limited to a mask of this type. Thus, in some cases the image of the weld may be modified through the use of stroboscopic lighting effects, for example, to produce a substantially stationary representation of the image at the detector.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In a welding system of the type in which a welding electrode is held in position adjacent a work piece to produce an electric arc therebetween,
   means for applying periodically varying electrical current to said welding electrode to generate an arc for forming a weld,
   light conducting means defining an image transmitting path extending from adjacent said weld to a position remotely located with respect thereto, said light conducting means having an objective end in spaced juxtaposition with said weld,
   optical detecting means disposed at said remotely located position for receiving an image of said weld from said light conducting means, and
   means between the arc and said detecting means for periodically interrupting said image at a predetermined frequency, to produce a series of momentary representations of said weld at said detecting means.

2. In a welding system of the type in which a welding electrode is held in position adjacent a work piece to produce an electric arc therebetween,
   means for applying electrical current pulses to said welding electrode at a predetermined frequency to generate successive electric arcs for forming droplets of weld material, said droplets contacting said work piece at the frequency of the applied pulses to form a weld,
   light conducting means defining an image transmitting path extending from adjacent said droplets to a position remotely located with respect thereto, said light conducting means having an objective end in spaced juxtaposition with said droplets,
   optical detecting means disposed at said remotely located position for receiving an image of said droplets from said light conducting means, and
   means between the arcs and said detecting means for modifying said image to produce a substantially stationary representation of said droplets at said detecting means.

3. In a welding system of the character set forth in claim 2, in which the modifying means comprises reticle means interposed in the path of said image for periodically interrupting the same at a frequency proportional to the frequency at which said droplets contact said work piece.

4. In a welding system of the character set forth in claim 3, said rectile means comprising:
   a pair of apertured discs mounted for rotation about an axis parallel to the path of said image, and
   means for rotating said discs in fixed relationship with each other.

5. In a welding system of the character set forth in claim 4, means for adjusting the angular position of one of said discs relative to the other disc during the rotation thereof.

6. In a welding system of the type in which a welding electrode is held in position adjacent a work piece to produce an electric arc therebetween,
   control means for applying electrical current pulses to said welding electrode at a predetermined frequency to generate successive electric arcs for forming droplets of weld material, said droplets contacting said work piece at the frequency of the applied pulses to form a weld,
   light conducting means defining an image transmitting path extending from adjacent said droplets and said arcs to a position remotely located with respect thereto, said light conducting means having an objective end in spaced juxtaposition with said droplets and said arcs,
   optical detecting means disposed at said remotely located position for receiving an image of said droplets and said arcs from said light conducting means, and
   means between the arcs and said detecting means for periodically interrupting said image at a frequency corresponding to the frequency at which said droplets contact said work piece, to produce a substantially stationary representation of said droplets and said arcs at said detecting means.

7. In a welding system of the character set forth in claim 6,
   means responsive to the stationary representation of said arcs for producing a feedback signal, and
   means for transmitting said feedback signal from said last-mentioned means to said control means, said control means automatically adjusting the pulses applied to said welding electrode in accordance with the representation of said arcs.

8. In a welding system of the type in which a welding electrode is held in position adjacent a work piece to produce an electric arc therebetween,
   means for applying periodically varying electrical current to said welding electrode to generate an arc for forming a weld, said arc tending to produce splatter in the vicinity of said weld,
   light conducting means defining an image transmitting path extending from adjacent said weld to a position remotely located with respect thereto, said light conducting means having an objective end in spaced juxtaposition with said weld, means interposed between said weld and the objective end of said light conducting means for preventing splatter from contacting said objective end, optical detecting means disposed at said remotely located position for receiving an image of said weld from said light conducting means, and means between the arc and said detecting means for periodically interrupting said image at a predetermined frequency, to produce a series of momentary representations of said weld at said detecting means.

9. In a welding system of the type in which a welding electrode is held in position adjacent a work piece to produce an electric arc therebetween, means for applying electrical current pulses to said welding electrode at a predetermined frequency to generate successive electric arcs for forming droplets of weld material, said droplets contacting said work piece at the frequency of the applied pulses to form a weld, the application of said droplets to said work piece tending to produce splatter in the vicinity of said weld, light conducting means defining an image transmitting path extending from adjacent said weld to a position remotely located with respect thereto, said light conducting means having an objective end in spaced juxtaposition with said weld, means interposed between said weld and the objective end of said light conducting means for preventing splatter from contacting said objective end, optical detecting means disposed at said remotely located position for receiving an image of said droplets from said light conducting means, and means between the arcs and said detecting means for modifying said image to produce a substantially stationary representation of said droplets at said detecting means.

10. In a welding system of the type in which a welding electrode is held in position adjacent a work piece to produce an electric arc therebetween, means for applying electrical current pulses to said welding electrode at a predetermined frequency to generate successive electric arcs for forming droplets of weld material, said droplets contacting said work piece at the frequency of the applied pulses to form a weld, the application of said droplets to said work piece tending to produce splatter in the vicinity of said weld, light conducting means defining an image transmitting path extending from adjacent said weld to a position remotely located with respect thereto, said light conducting means having an objective end in spaced juxtaposition with said weld, means including a continuously movable transparent member interposed between said weld and the objective end of said light conducting means for preventing splatter from contacting said objective end, optical detecting means disposed at said remotely located position for receiving an image of said droplets from said light conducting means, and means for periodically interrupting said image at a frequency corresponding to the frequency at which said droplets contact said work piece, to produce a substantially stationary representation of said droplets at said detecting means.

11. In a welding system of the character set forth in claim 10, said continuously movable transparent member comprising a rotary disc supported adjacent the objective end of said light conducting means, and fluid pressure means for rotating said disc at a speed sufficient to direct splatter away from said objective end by centrifugal force.

12. In a welding system of the type in which a welding electrode is held in position adjacent a work piece to produce an electric arc therebetween, means for applying electrical current pulses to said welding electrode at a predetermined frequency to generate successive electric arcs for forming droplets of weld material, said droplets contacting said work piece at the frequency of the applied pulses to form a weld, the application of said droplets to said work piece tending to produce splatter in the vicinity of said weld, light conducting means defining an image transmitting path extending from adjacent said weld to a position remotely located with respect thereto, said light conducting means having an objective end in spaced juxtaposition with said weld, means including a continuously rotatable transparent member interposed between said weld and the objective end of said light conducting means for preventing splatter from contacting said objective end, optical detecting means disposed at said remotely located position for receiving an image of said droplets from said light conducting means, and rotary disc means for periodically interrupting said image at a frequency proportional to the frequency at which said droplets contact said work piece, to produce a substantially stationary representation of said droplets at said detecting means, said disc means being supported at said remotely located position and having at least one adjustable aperture for modifying said image to produce said substantially stationary representation.

13. In a welding system of the character set forth in claim 12, said disc means comprising a plurality of coaxial discs in spaced relationship with each other, and means for rotating said discs at a constant speed.

14. In a welding system of the character set forth in claim 13, in which each of said discs includes a plurality of apertures therein, the apertures in one of said discs overlapping the apertures in the other disc, and adjustment means for varying the angular position of said one disc relative to the other disc, to modify the degree of overlap of said apertures.

15. In a welding system of the character set forth in claim 14, said discs being rotated in fixed relationship with each other, said adjustment means moving said one disc in an axial direction relative to the other disc during the rotation thereof and simultaneously varying said angular position.

References Cited

UNITED STATES PATENTS 3,449,544    6/1969    Needham.

JOSEPH V. TRUHE, Primary Examiner

J. G. SMITH, Assistant Examiner